(12) United States Patent
Denisov et al.

(10) Patent No.: US 12,179,261 B2
(45) Date of Patent: Dec. 31, 2024

(54) DRYING DEVICE FOR A POWDERED BUILD MATERIAL, AND INSTALLATION FOR PRODUCING THREE-DIMENSIONAL COMPONENTS

(71) Applicant: One Click Metal GmbH, Tamm (DE)

(72) Inventors: Roman Denisov, Ludwigsburg (DE); Björn Ullmann, Bönnigheim (DE)

(73) Assignee: One Click Metal GmbH, Tamm (DE)

( * ) Notice: Subject to any disclaimer, the term of this patent is extended or adjusted under 35 U.S.C. 154(b) by 84 days.

(21) Appl. No.: 17/814,913

(22) Filed: Jul. 26, 2022

(65) Prior Publication Data

US 2023/0035265 A1 Feb. 2, 2023

(30) Foreign Application Priority Data

Jul. 26, 2021 (DE) ...................... 10 2021 119 308.7

(51) Int. Cl.
*B22F 12/52* (2021.01)
*B22F 1/145* (2022.01)
(Continued)

(52) U.S. Cl.
CPC .............. *B22F 1/145* (2022.01); *B22F 10/28* (2021.01); *B22F 12/41* (2021.01); *B22F 12/52* (2021.01); *B33Y 30/00* (2014.12); *B33Y 40/10* (2020.01)

(58) Field of Classification Search
CPC .......... B22F 10/28; B22F 12/41; B22F 12/52; B22F 10/73; B33Y 30/00; B33Y 40/10;
(Continued)

(56) References Cited

U.S. PATENT DOCUMENTS 7,544,234 B2 6/2009 Fornof
2020/0147884 A1* 5/2020 Flick ...................... B29C 64/209
2021/0268738 A1* 9/2021 Kenworthy ............. B22F 12/38

FOREIGN PATENT DOCUMENTS

CN 112756632 A * 5/2021
DE 10313575 A1 1/2014
DE 102019130951 A1 5/2021

* cited by examiner

*Primary Examiner* — Rebecca Janssen
(74) *Attorney, Agent, or Firm* — Renner, Otto, Boisselle & Sklar, LLP.

(57) ABSTRACT

A drying device for a powdered building material, in particular for a building station, unpacking station and/or sieve station which can be combined to form an installation for producing three-dimensional components by layer-by-layer solidification by means of a beam acting on the powdered building material, having a container which has a container base and, opposite the container base, a container opening, having a connection flange which has a fastening portion for releasably receiving the container opening of the container, having a connection portion which is located opposite the fastening portion of the connection flange and has a through-opening, having a membrane which closes the through-opening and can be connected to the connection portion, having a retaining element arranged in the container, by means of which retaining element drying agent stored in the container is held separate or remote from the membrane, and a drying space which receives the drying agent and a free space arranged between the retaining element and the membrane is formed.

10 Claims, 4 Drawing Sheets

(51) Int. Cl.
*B22F 10/28* (2021.01)
*B22F 12/41* (2021.01)
*B33Y 30/00* (2015.01)
*B33Y 40/10* (2020.01)

(58) Field of Classification Search
CPC ..... B33Y 40/00; B29C 64/364; B29C 64/255; B29C 64/314; Y02P 10/25
See application file for complete search history.

DRYING DEVICE FOR A POWDERED BUILD MATERIAL, AND INSTALLATION FOR PRODUCING THREE-DIMENSIONAL COMPONENTS

This application claims priority of German Application No. 10 2021 119 308.7, filed Jul. 26, 2021, which is hereby incorporated herein by reference in its entirety.

The invention relates to a drying device for a powdered building material, in particular for a building station, unpacking station and/or sieve station which can be connected together to form an installation for producing three-dimensional components by selective solidification by means of a beam acting on the powdered building material. The invention relates further to an installation for producing a three-dimensional component by successive solidification by means of a beam acting on a powdered building material, which installation comprises at least one drying device in a building station, unpacking station and/or sieve station, and to a storage container.

An installation for producing three-dimensional components by successively solidifying layers of the powdered building material is known from DE 10 2019 130 951 A1. For supplying the installations with powdered building material, cartridges which feed fresh or cleaned building material to a feed station are known. In the feed station there is provided a storage funnel, via which the powdered building material is fed to a process chamber of the building station. The powdered building material that is not solidified in the production of the three-dimensional component is fed to an emptying station. The discharged powdered building material is fed to a cartridge again via a collecting funnel of the emptying station. An emptying station for discharging the unsolidified powdered building material is likewise provided in the unpacking station, wherein the unsolidified building material is again fed to a cartridge via a collecting funnel. In a sieve station, processed powdered building material can be fed via a cartridge. A storage funnel is preferably arranged upstream of the sieve station. The powdered building material cleaned by the sieve station can in turn be fed to a cartridge, for example via a collecting funnel. By means of this arrangement, a circuit for powdered building material can be created, so that processed and/or cleaned building material can be re-used and fed to the building station.

As a result of the removal of the three-dimensional component that has been produced from the process chamber of the building station and the feeding of the three-dimensional component into an unpacking chamber of the unpacking station and/or during handling of building material in the sieve station, the building material can come into contact with the atmosphere as a result of the interfaces and in particular can absorb ambient moisture. There is thus the risk of increased oxidation of the powdered building material. This can lead to increased brittleness on solidification of the powdered building material during production of the three-dimensional component. In addition, there can be a change in the flow behavior of the powdered building material the powder circuit as a result of the absorption of moisture.

The object underlying the invention is to propose a drying device for a powdered building material and also an installation, in particular for producing three-dimensional components by layer-by-layer solidification by means of a beam acting on the powdered building material, and also a storage container, by means of which a moisture content in powdered building material is reduced.

This object is achieved by a drying device for a powdered building material, which drying device comprises a container which has a container base and, opposite the container base, a closable container opening, and a connection flange which has a fastening portion for the releasable fastening of the container opening, and having a connection portion which is located opposite the fastening portion of the connection flange and has a through-opening and having a membrane which covers the through-opening and can be positioned at the connection portion of the connection flange, and having a retaining element which is arranged in the container and by means of which drying agent stored in the container is held separate or remote from the membrane, and a drying space which receives the drying agent and a free space provided between the retaining element and the membrane is formed.

Such a drying device can be connectable both to a storage container for storing powdered building material and to a storage funnel of a feed station or a collecting funnel of an emptying station in an installation for producing three-dimensional components. The construction of the drying device allows moisture transported by the powdered building material to pass through the membrane first into the free space. The moisture can then disperse throughout the free space and pass through the retaining element into the drying space. The moisture is adsorbed by the drying agent provided in the drying space. Moisture can thus be removed from one or more stations of the installation or from the storage container and collected in the drying device. A powdered building material with a low or reduced moisture content results in an increase in the process quality and also in the component quality.

Furthermore, it is preferably provided that the retaining element can be inserted in the container in a replaceable manner. The retaining element can preferably be removed from the container so that, when the drying agent is saturated with the absorbed moisture, the drying agent can easily be replaced. Alternatively, the drying agent can also be heated in a heat source, such as, for example, a microwave, so that it releases the moisture completely again. The drying agent can be used again.

It is preferably provided that the retaining element is in the form of a mesh, screen or in the form of a support structure with a moisture-permeable membrane. Such retaining elements are structurally simple and can easily hold the drying agent in position within the drying space in the container. The retaining element preferably has a cylindrical annular collar, so that the retaining element engages an inner circumferential wall of the container by friction and/or clamping. It is thus possible for the retaining element to be arranged in a secured position within the container in order to enclose a defined volume of the drying space.

According to a further preferred embodiment of the drying device, it is provided that at least one seal is provided between the container and the fastening portion of the connection flange. The interface between the container and the connection flange is thus sealed with respect to the surrounding area, so that no further moisture can enter from the surrounding area.

The membrane is advantageously held at the connection portion of the connection flange by a seal, in particular a flat seal. This permits easy installation and also easy replacement of the membrane.

The membrane is preferably in the form of a moisture-permeable membrane. It has in particular a high water vapor permeability and is impermeable to the powdered building material.

The container of the drying device is preferably formed, at least in some regions, of a transparent material. It is thus possible to monitor the state of the drying agent visually by means of a color indicator in the drying space of the container.

Furthermore, it is preferably provided that a fill quantity of drying agent is provided in the drying space in the container, so that at least one tenth of the volume of the drying space is free of drying agent. In particular in the case of a vertical orientation of the retaining element within the container, this allows the drying agent to accumulate in the drying space at the container circumferential wall and a free volume to form above the drying agent, within which the atmospheric moisture can disperse evenly and be absorbed by the drying agent. This arrangement provides an increased surface area of the drying agent for adsorption of the moisture.

Furthermore, it is preferably provided that there is provided as the drying agent a powdered, spherical or pebble-shaped material which takes up moisture by adsorption. Such a drying agent can typically be a so-called silica gel or zeolite.

The drying agent can indicate the absorption of moisture by a color change. It can thus easily be recognized visually that and/or to what extent moisture has been absorbed. Furthermore, the time for replacing the drying agent can also easily be recognized.

The object underlying the invention is further achieved by an installation, in particular for producing a three-dimensional component by layer-by-layer solidification by means of a beam acting on a powdered building material, which installation comprises a building station, unpacking station and/or sieve station, wherein the building station, unpacking station and/or sieve station comprises at least one feed station with a storage funnel, and/or an emptying station with a collecting funnel, wherein at least one drying device according to one of the preceding embodiments can be connected at least to the storage funnel and/or to the collecting funnel.

The moisture optionally entrained in the powdered building material can pass into the drying space via the membrane of the drying device and be adsorbed by the drying agent. The powdered building material is thereby guided past in the drying device, preferably without coming into direct contact with the drying device. The moisture optionally entrained in the powdered building material can thus be guided out of or discharged from the powdered building material. This increases the component quality, because increased oxidation of the powdered building material is reduced and brittleness in the component is thus also reduced. Furthermore, the process quality of such an installation is improved, because powder application in the process can be impaired considerably by moist powder material. A moisture-laden building material can additionally change the flow behavior in a disadvantageous manner by accumulating or forming bridges at individual locations. This can be avoided.

A housing of the storage funnel and/or of the collecting funnel advantageously has an opening which can be closed by the drying device by means of its membrane. This allows such a drying device to be connected easily to the storage funnel and/or the collecting funnel. In addition, improved moisture removal can be made possible by the direct connection to the housing.

The drying device is preferably provided at vertically oriented wall portions of the housing of the storage funnel and/or of the collecting funnel. This allows a free volume to be provided within the drying space in the container of the drying device above the drying agent, whereby an increased surface area for the absorption of moisture is provided and a more even distribution of the moisture above the drying agent is made possible.

In particular it is provided that the drying device is provided at vertically oriented wall portions of the housing adjoining or adjacent to a feed opening of the storage funnel and/or of the collecting funnel and/or is oriented towards the visible side of the building station, unpacking station and/or sieve station. The drying device associated with the feed opening makes it possible that powdered building material accumulating in the storage funnel and/or in the collecting funnel does not come directly into contact with the membrane. By orienting the drying device towards the visible side of the building station, unpacking station and/or sieve station, quick and easy monitoring and visual checking is made possible.

The object underlying the invention is further achieved by a storage container for transporting and storing powdered building material for an installation, in particular for producing a three-dimensional component by layer-by-layer solidification by means of a beam acting on the powdered building material, which storage container comprises a powder receiver which can be closed by a closure member, wherein the powder receiver and/or the closure member has at least one opening to which a drying device according to one of the above-described embodiments can be connected. The powdered building material can thus be provided with a low or reduced moisture content, because the moisture in the atmosphere precipitates at the powder particles of the building material and condenses out.

The invention and further advantageous embodiments and further developments thereof will be described and explained in detail in the following text by means of the examples shown in the drawings. The features which are to be found in the description and the drawings can be applied according to the invention individually on their own or in a plurality in any desired combination. In the figures:

Figure 1:
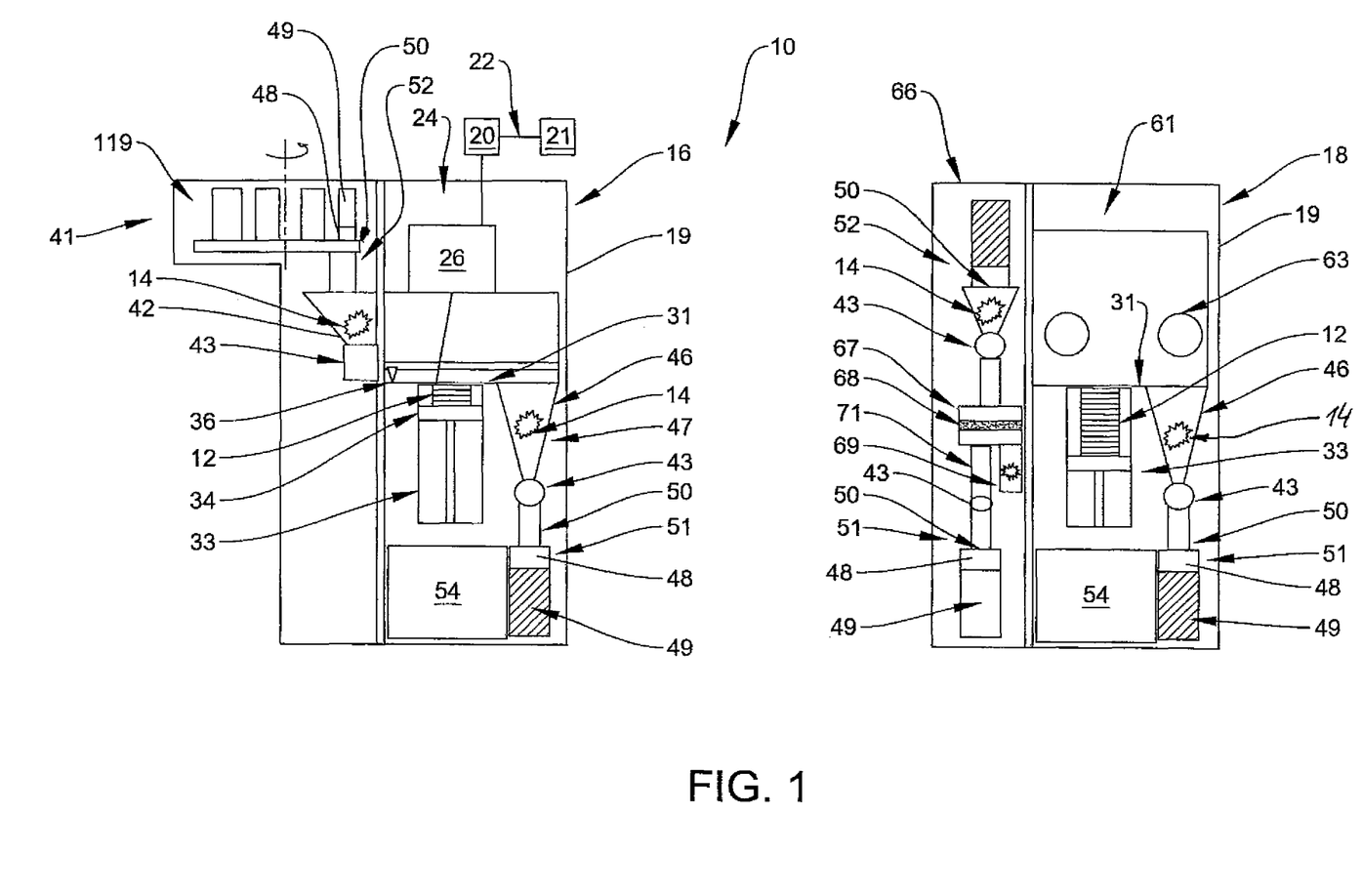
FIG. 1 is a schematic view from the front of an installation for producing three-dimensional components having a building station, an unpacking station and a sieve station.

FIG. 1 shows, schematically, a side view of an installation 10 for producing a three-dimensional component 12 by successively solidifying layers of a powdered building material 14. This installation 10 comprises, for example, a building station 16 and an unpacking station 18. This building station 16 and the unpacking station 18 each comprise a housing 19 and are provided separately from one another. Alternatively, this building station 16 and the unpacking station 18 can also be provided in a common housing 19 of the installation 10.

The building station 16 comprises a beam source 21, for example in the form of a laser source. This beam source 21 emits a beam 22, in particular a laser beam 22, which is fed via a beam guide to a processing head 26 of a process chamber 24. The beam 22 is directed via the processing head 26 onto the building material 14. This processing head 26 can be arranged on a linear axis system. This linear axis system 28 can be in the form of a two-axis system, so that the processing head 26 is movable in the process chamber 24 in the X-/Y-plane parallel to and above a work surface 31. Alternatively to the processing head 26, a scanner device can also be associated with the process chamber 24. The scanner device comprises a controllable scanner mirror by means of which the beam 21 is directed onto the building material 14.

In the work surface 31 there is a building module 33 within which a substrate plate 34 is guided so as to be movable up and down. The three-dimensional component 12 is produced on this substrate plate 34 by selectively solidifying the powdered building material 14.

Above the work surface 31 there is preferably provided an application and levelling device 36. This application and levelling device 36 travels over the work surface 31. In this manner, on the one hand the powdered building material 14 can be applied into the building module 33 and at the same time the excess building material 14 which has been applied can be discharged from the building module 33 in a collecting device 46 by the levelling device.

The building material 14 preferably consists of a metal powder or ceramics powder. Other materials which are suitable and employed for laser melting and/or laser sintering can also be used. The process chamber 24 is preferably hermetically sealed. For producing the three-dimensional component 12, the process chamber is filled with protecting gas or an inert gas in order to avoid oxidation on melting of the building material 14.

The building station 16 further comprises a powder storage device 41. This powder storage device 41 has a powder storage funnel 42 which is preferably equipped with a fill level sensor in order to detect the stored level of building material 14. Via a metering device 43, a predetermined amount of building material 14 is removed from the powder storage funnel 42 and fed to the application and levelling device 36 in the process chamber 24.

The building material 14 that has not solidified after the exposure process is transferred by means of the application and levelling device 36 into a collecting device 46. This collecting device 46 preferably comprises a collecting funnel 47, the opening of which is integrated in the work surface 31 or lies in the work surface 31. This collecting device 46 feeds the processed building material 14 introduced via the application and levelling device 36 to a downstream metering device 43.

Associated with this metering device 43 downstream is a connection point 50 of an emptying station 51, which is provided for connection of a connecting device 48 to which a cartridge container 49 can be fastened. Via the metering device 43, a predetermined amount of processed building material 14 is transferred into the cartridge container 49.

A storage place 54 for further cartridge containers 49 and/or connecting devices 48 can be provided in the housing 19 of the building station 16. Both filled and empty cartridge containers 49 can be stored in this storage place 54.

"Fresh building material" 14 is understood as being building material 14 that is for the first time provided for the production of a three-dimensional component 12 and fed to the process chamber 24 for the process of producing the three-dimensional component 12.

"Processed building material" 14 is understood as being powdered building material 14 that has been fed to the process chamber 24 and was not solidified by the selective solidification by means of the beam 22. This unsolidified powdered building material 14 is guided out of the process chamber 24 by the application and levelling device 36.

"Cleaned building material" 14 is understood as being building material 14 that, starting from processed building material, has been cleaned, for example in a sieve station. The processed building material is thereby freed of oversized impurities and the like. This cleaned building material can again be fed to the building station 16 for a work process.

The building station 16 can further comprise in the powder storage device 41 a connection point 50 of a feed station 52 for at least one connecting device 48 with the cartridge container 49. This is shown herein below in FIG. 5.

The unpacking station 18 comprises an unpacking chamber 61 in which the building module 33, which for removal from the process chamber 24 is preferably closed by a cover, can be inserted in order subsequently to be emptied in the unpacking station 18. The substrate plate 34 with the component 12 is removed from the building module 33 and cleaned of unsolidified building material 14 in the unpacking chamber 61. The processed building material 14 which accumulates in the unpacking chamber 61 on a work surface 31 is transferred to a collecting device 46, which can be configured analogously to the collecting device 46 of the building station 16. Via the metering device 43, processed building material 14 is fed to the connection point 50 of the emptying station 51. A connecting device 48 which receives an empty cartridge container 49 can be fastened to the connection point 50. This cartridge container 49 is filled with processed building material 14.

Openings 63 with a glove port can be provided in the unpacking chamber 61 for freeing the component 12 of loose building material 14 and feeding the loose building material to the collecting device 46. A suction device for cleaning the component 12 and/or the work surface 31 can also be provided.

The cartridge container 49 filled with the processed building material 14 is fed to a sieve station 66. This sieve station 66 can be integrated in the unpacking station 18. The sieve station 66 can also be integrated in the building station 16. The sieve station 66 can further be arranged so that it is isolated and separate from the building station 16 and the unpacking station 18. The building station 16, the unpacking station 18 and the sieve station 66 can also form a common installation in a housing 19.

The sieve station 66 comprises at least one connection point 50 for receiving the connecting device 50 at a feed station 52, to which the connecting device 48 with the cartridge container 49 can be fastened. The processed building material 14 delivered by the cartridge container 49 through connecting device 50 is preferably fed by means of a metering device 43, in particular a metering screw, to a sieve device 67. This sieve device 67 comprises a sieve 68 which can preferably be excited by means of ultrasonic frequencies or low frequencies. The processed powdered building material 14 can thereby be cleaned. For example, coarse particles or oversized particles and/or impurities can be retained by the sieve 68 and transferred to an oversized-particle container 69. The processed powdered building material 14, which is free of oversized particles and/or impurities, is discharged as cleaned building material 14 via an outlet opening 71. This further outlet opening 71 opens into a connection point 50 of an emptying station 51, to which the connecting device 48 with an empty cartridge container 49 arranged thereon can be fastened. The cartridge container 49 serves to receive the processed and cleaned powdered building material 14.

The connecting device 48 with the cartridge container 48 filled with the processed and cleaned building material 14 is then conveyed to the powder storage device 41 again in order to supply the powder storage device 41 with building material 14.

The term "feed station" 52 is understood as meaning that the connecting device 48 with a cartridge container 49 filled with building material 14 can be connected to this feed station 52 so that the building material 14 provided in the cartridge container 49 can be fed to the respective station, in particular the building station 16 and the sieve station 66.

The term "emptying station" 51 is understood as meaning that a connecting device 48 with an empty cartridge container 49 can be connected to this emptying station 51 in order to transfer processed and/or cleaned building material 14 into the cartridge container 49. The processed and/or cleaned building material 14 can thus be guided out of the respective station, in particular the building station 16, the unpacking station 18 and/or the sieve station 66.

Figure 2:
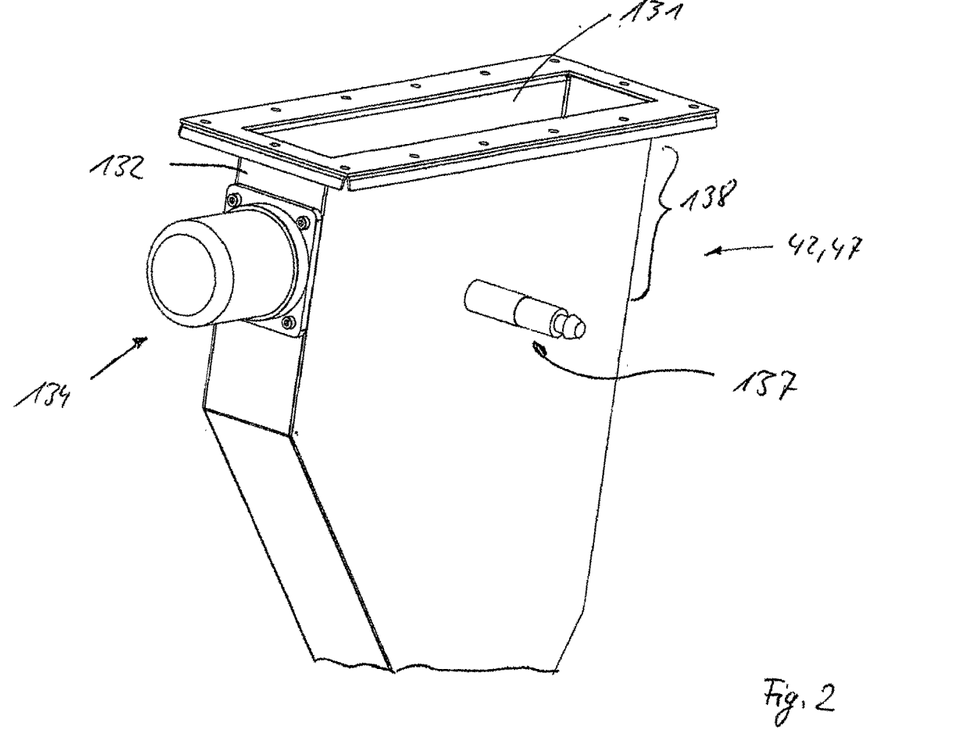
FIG. 2 is a perspective view of a storage funnel with a drying device.

FIG. 2 shows the storage funnel 42 in perspective. This storage funnel 42 of the feed station 52 corresponds in construction to the collecting funnel 47 of the emptying station 51. The following observations relating to the storage funnel 42 apply correspondingly to the collecting funnel 47.

Figure 3:
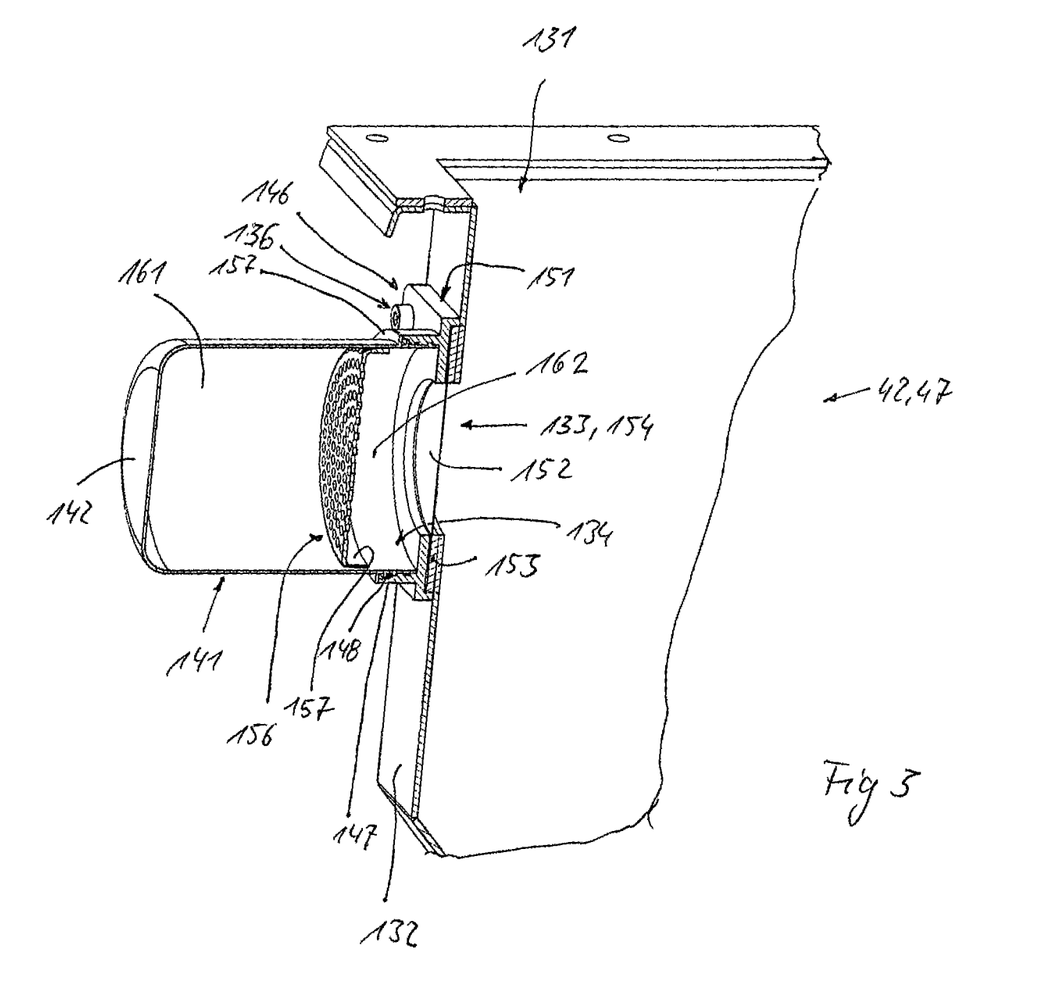
FIG. 3 is a schematic enlarged sectional view of the drying device according to FIG. 3.

The storage funnel 42 comprises a feed opening 131 through which powdered building material 14 is fed to the storage funnel 42. The metering device 43 is provided at the lower end (not shown) of the storage funnel 42. At least one wall portion 132 is formed adjoining the feed opening 131. This wall portion 132 is preferably oriented vertically. This wall portion 132 comprises an opening 133. This opening 133, which is shown in FIG. 3, is closed by a drying device 134. The drying device 134 is preferably arranged on the wall portion 132 in a detachable manner by fastening means 136. The opening 133 is preferably provided adjoining the feed opening 131 or adjacent thereto. The drying device 134 is thus positioned at a distance from the metering device 34. The powdered building material 14 transferred into the storage funnel 42 can accumulate above the metering device 43. It is preferably provided that a fill level of the powdered building material is monitored by a fill level sensor 137. There is thus at least a free volume 138 between the fill level sensor 137 and the feed opening 131, in which free volume moisture which has been absorbed by the powdered building material 14 in preceding process steps can accumulate. This moisture can be guided out of the free volume 138 in the storage funnel 42 by the drying device 134.

FIG. 3 shows a schematic sectional view of the drying device 134 according to FIG. 2 on an enlarged scale. The drying device 134 comprises a container 141. The container 141 comprises a container base 142 and, on the opposite side to the container base, a container opening 143. The drying device 134 further comprises a connection flange 146, which has a fastening portion 147 by which the container opening 134 of the container 141 is releasably connected to the connection flange 146. At least one seal 148 can be provided between the container opening 141 and the fastening portion 147. A radially outwardly protruding annular collar 157 is advantageously provided at the container opening 143. It is thus possible to provide defined contact and fastening of the container 141 with the container opening 143 relative to the fastening portion 147. In addition, sealing faces on the container opening 143 and of the fastening portion 147 may also abut one another for the purpose of further sealing.

Opposite the fastening portion 147, the connection flange 146 has a connection portion 151 by which the container 141 can be fastened to the wall portion 132. Abutting this connection portion 151 there is provided a membrane 152. A seal, in particular a flat seal 153, is provided between the membrane 152 and the wall portion 132. On the one hand, the membrane 152 is thereby held fixed to the connection flange 151. On the other hand, the opening 133 is sealed with respect to the surrounding area. The opening 133 is closed by the membrane 152.

Figure 4:
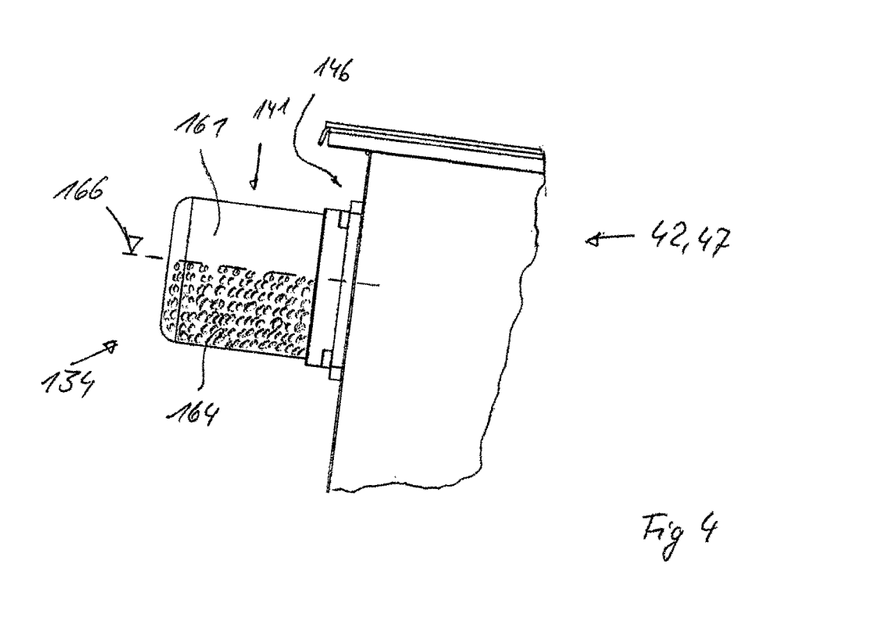
FIG. 4 is a schematic side view of the drying device according to FIG. 2 filled with drying agent.

A retaining element 156 is positioned in the container 141. This retaining element 156 is in the form of a mesh, screen or in the form of a support structure with a membrane. The retaining element 156 preferably has an annular collar 157, whereby the retaining element 156 can be fastened to an inside wall of the container 141 by clamping. By means of the retaining element 156, the drying device 134 is divided into a drying space 161 and a free space 162. Drying agent 164 is preferably provided in the drying space 161 (FIG. 4). The retaining element 156 in the form of a screen or mesh has a mesh size which is smaller than the particle size of the drying agent 164.

By means of the retaining element 156 arranged in a replaceable manner in the container 141, the container 141 can easily be filled with drying agent 164. Moist drying agent 164 can also easily be replaced. The free space 162 formed between the membrane 152 and the retaining element 156 is preferably smaller in volume than the drying space 161.

FIG. 4 shows a schematic side view of the drying device 134 according to FIG. 2. The container 141 is of transparent form at least in some regions, so that the drying agent 164 is visually accessible. Preferably the entire container 141 is of transparent form.

A fill quantity of drying agent 164 is provided in the drying space 161, so that, in particular in the case of a horizontal orientation of the drying device 134, a free volume remains in the drying space 161 above the drying agent 164. For example, the fill quantity of the drying agent 164 can comprise half the volume in the drying space 161 according to line 166. A larger fill quantity or a smaller fill quantity of drying agent 164 can also be provided. In any case, the fill volume of drying agent 164 does not correspond to the volume of the drying space 161 but is smaller, so that a free volume always remains above the drying agent 164.

Figure 5:
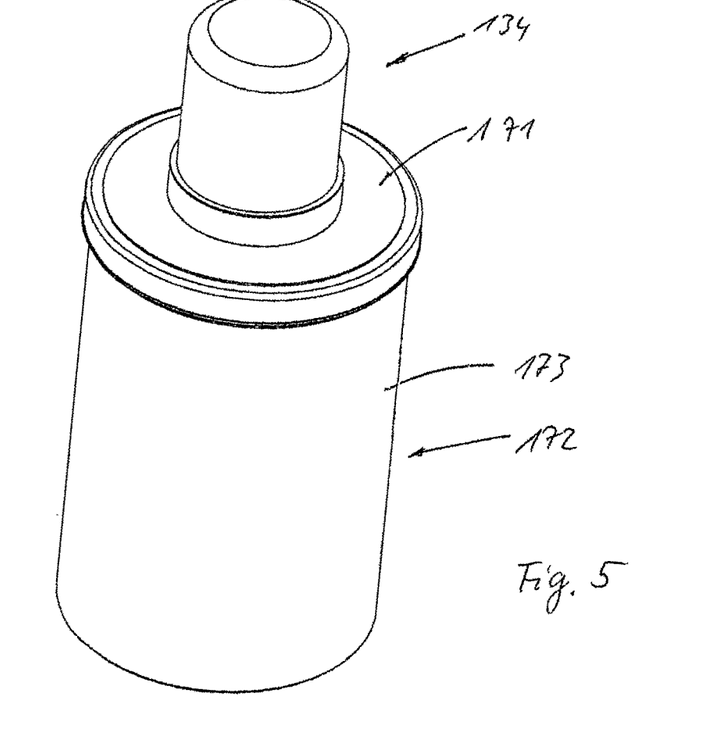
FIG. 5 is a perspective view of a storage container for powdered building material with a drying device.
Figure 6:
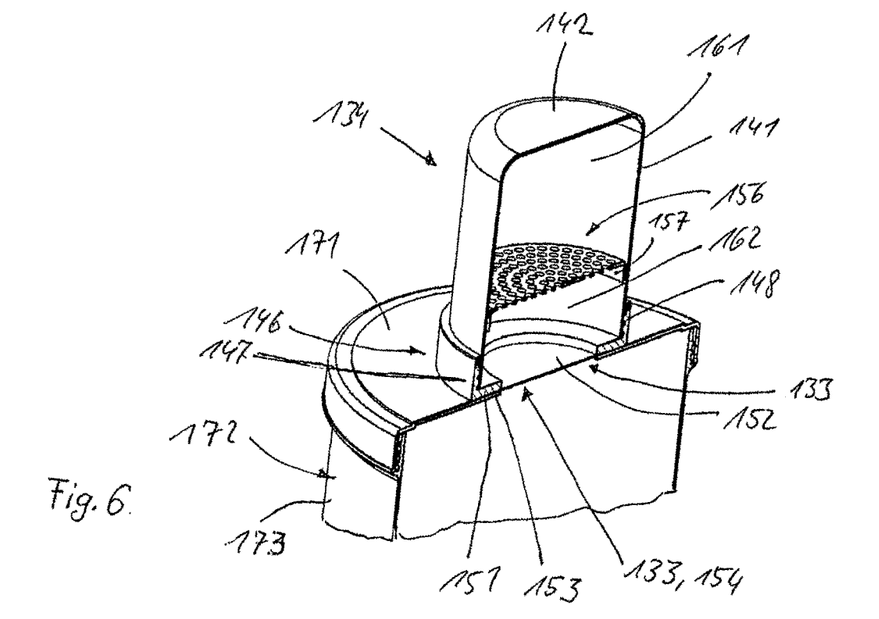
FIG. 6 is a schematic enlarged sectional view of the drying device at a closure member of a powder receiver of the storage container according to FIG. 5.

The above-described drying device 134 can further be provided at a closure member 171 or cover or a powder receiver 173 of a storage container 172. The closure member 171 preferably has the opening 133. This is positioned by the drying device 134 analogously to the opening 133 at the storage funnel 42. Thus, moisture removal can likewise be provided on transportation or storage of the powdered building material 14 in the storage container 172.

Furthermore, the opening 133 can be provided at the powder receiver 173.

Furthermore, it can be provided that this drying device 134 is provided at a cartridge container 49, in particular at a vertically oriented wall portion or at a base located opposite a cartridge opening.

| | |
|---|---|
| 10. | Installation |
| 11. | |
| 12. | Component |
| 13. | |
| 14. | Building material |
| 15. | |

-continued

| | |
|---|---|
| 16. | Building station |
| 17. | |
| 18. | Unpacking station |
| 19. | Housing |
| 20. | Beam guide |
| 21. | Beam source |
| 22. | Beam |
| 23. | Beam deflection device |
| 24. | Process chamber |
| 25. | |
| 26. | Processing head |
| 27. | |
| 28. | |
| 29. | |
| 30. | |
| 31. | Work surface |
| 32. | |
| 33. | Building module |
| 34. | Substrate plate |
| 36. | Application and levelling device |
| 41. | Powder storage device |
| 42. | Storage funnel |
| 43. | Metering device |
| 44. | Metering screw |
| 46. | Collecting device |
| 47. | Collecting funnel |
| 48. | Connecting device |
| 49. | Cartridge container |
| 50. | Connection point |
| 51. | Emptying station |
| 52. | Feeding station |
| 53. | Cover |
| 54. | Storage place |
| 61. | Unpacking chamber |
| 63. | Openings |
| 66. | Sieve station |
| 67. | Sieve device |
| 68. | Sieve |
| 69. | Oversized-particle container |
| 71. | Outlet opening |
| 131. | Feed opening |
| 132. | Wall portion |
| 133. | Opening |
| 134. | Drying device |
| 136. | Fastening element |
| 137. | Fill level sensor |
| 138. | Free volume |
| 141. | Container |
| 142. | Container base |
| 143. | Container opening |
| 146. | Connection flange |
| 147. | Fastening portion |
| 148. | Sealing |
| 149. | Annular collar |
| 151. | Connection portion |
| 152. | Membrane |
| 153. | Flange sealing |
| 154. | Through-opening |
| 156. | Retaining element |
| 157. | Annular collar |
| 161. | Drying space |
| 162. | Free space |
| 164. | Drying agent |
| 166. | Line |
| 171. | Closure member |
| 172. | Storage container |
| 173. | Powder receiver |

The invention claimed is:

1. A drying device for a powdered building material, for a building station, unpacking station and/or sieve station which are combinable to form an installation for producing three-dimensional components by layer-by-layer solidification by means of a beam acting on the powdered building material,
having a container which has a container base and, opposite the container base, a container opening,
having a connection flange which has a fastening portion for releasably receiving the container opening of the container,
having a connection portion which is located opposite the fastening portion of the connection flange and has a through-opening,
having a membrane which closes the through-opening and which is connectable to the connection portion,
having a retaining element arranged in the container, by means of which retaining element drying agent stored in the container is held separate or remote from the membrane, and a drying space which receives the drying agent and a free space arranged between the retaining element and the membrane is formed.

2. The drying device according to claim 1, wherein the retaining element is provided in a replaceable manner in the container.

3. The drying device according to claim 1, wherein the retaining element is in the form of a mesh, screen or in the form of a support structure having a membrane, which has an annular collar which engages an inner circumferential wall of the container by friction and/or clamping.

4. The drying device according to claim 1, wherein at least one seal is provided between the container and the fastening portion of the connection flange.

5. The drying device according to claim 1, wherein the membrane is held at the connection portion of the connection flange by a seal, in particular a flat seal.

6. The drying device according to claim 1, wherein the membrane is in the form of a moisture-permeable membrane.

7. The drying device according to claim 1, wherein the container is formed at least in some regions of a transparent material.

8. The drying device according to claim 1, wherein a fill quantity of drying agent is provided in the drying space, so that at least one tenth of the volume of the drying space, or at least half of the volume of the drying space, is free of drying agent.

9. The drying device according to claim 8, wherein there is provided as the drying agent a powdered, spherical or pebble-shaped material which takes up moisture by adsorption.

10. The drying device according to claim 8, wherein the drying agent indicates the absorption of moisture by a color change.

* * * * *